(12) United States Patent
Girafi (10) Patent No.: US 10,520,204 B2
(45) Date of Patent: Dec. 31, 2019

(54) HEAT PUMP AND HEAT EXCHANGER HEATING SYSTEM FOR A DOMESTIC HOT WATER TANK

(71) Applicant: KIRUR NERI LTD., Emanuel (IL)

(72) Inventor: Neria Girafi, Emanuel (IL)

(73) Assignee: KIRUR NERI LTD., Emanuel (IL)

( * ) Notice: Subject to any disclaimer, the term of this patent is extended or adjusted under 35 U.S.C. 154(b) by 0 days.

(21) Appl. No.: 15/418,791

(22) Filed: Jan. 30, 2017

(65) Prior Publication Data

US 2017/0219220 A1 Aug. 3, 2017

(30) Foreign Application Priority Data

Jan. 31, 2016 (IL) .......................................... 243858

(51) Int. Cl.
| | |
|---|---|
| F24D 19/10 | (2006.01) |
| F25B 30/02 | (2006.01) |
| F25B 30/06 | (2006.01) |
| F24H 4/04 | (2006.01) |
| F28D 20/00 | (2006.01) |
| F28D 7/02 | (2006.01) |

(52) U.S. Cl.
CPC .......... *F24D 19/1078* (2013.01); *F24H 4/04* (2013.01); *F25B 30/02* (2013.01); *F25B 30/06* (2013.01); *F28D 7/024* (2013.01); *F28D 20/00* (2013.01); *F28D 20/0034* (2013.01); *F24D 2200/123* (2013.01); *F24D 2200/14* (2013.01); *Y02B 10/20* (2013.01); *Y02B 10/70* (2013.01); *Y02B 30/125* (2018.05); *Y02E 60/142* (2013.01)

(58) Field of Classification Search
CPC .................................................... F24D 19/1078
USPC ......................................................... 126/613
See application file for complete search history.

(56) References Cited

U.S. PATENT DOCUMENTS

| | | | | |
|---|---|---|---|---|
| 1,906,145 | A * | 4/1933 | Evans ...................... | F24H 1/162 392/481 |
| 5,050,394 | A * | 9/1991 | Dudley ................... | F24D 17/02 62/115 |
| 5,372,185 | A * | 12/1994 | Lannes ................... | F24D 3/082 122/15.1 |
| 6,283,067 | B1 * | 9/2001 | Akkala ................... | F24D 12/02 122/14.22 |
| 2008/0149317 | A1 * | 6/2008 | Baker ...................... | F28D 7/022 165/163 |
| 2010/0101767 | A1 * | 4/2010 | Furui ...................... | F24D 3/087 165/163 |
| 2013/0161404 | A1 * | 6/2013 | Shtilerman ............... | F24H 4/04 237/8 A |

* cited by examiner

Primary Examiner — Avinash A Savani
(74) Attorney, Agent, or Firm — Mark M. Friedman (57) ABSTRACT

A water heating system for a domestic hot water tank, the system including: a heat pump adapted to provide heat energy; and a heat exchanger comprising a coil of thermally conductive material arranged such that a diameter of the coil is approximately between five and six times greater than a diameter of the thermally conductive material and the heat exchanger is adapted to be installed in the domestic hot water tank and operationally coupled to the heat pump.

27 Claims, 4 Drawing Sheets

HEAT PUMP AND HEAT EXCHANGER HEATING SYSTEM FOR A DOMESTIC HOT WATER TANK

FIELD OF THE INVENTION

The present invention relates to domestic water boilers and, more particularly, to an improved system and method for rapid heating of a water boiler using a heat exchanger and heat pump.

BACKGROUND OF THE INVENTION

Electric water heaters warm tap water through a heating element, which is immersed inside the tank. Electric heaters need to heat a large amount of water to ensure a sufficient supply of hot water, as the electric heater is not capable of heating water on demand. Another drawback of the electric heater is that the heating element is prone to burn-out, especially in hard water conditions. Sediment from dissolved calcium or other minerals in the water encases the heating element, eventually shorting it out.

Tank-less water heaters are also called instantaneous, continuous flow, inline, flash, on-demand, or instant-on water heaters. Gas models do not have heating elements, but rather warm water with a burner instead. According to this arrangement, the gas water heater is able to provide hot water on-demand. However, gas water heaters are expensive to operate—even more so than electric heaters.

The use of heat pumps and heat exchangers for heating water boilers is not a new idea. Various types of heat pumps and/or heat exchangers are also known in the art. All of the systems known in the art suffer from one or more drawbacks including: the need for building a specialized system, use of gas or solar energy to heat the water and having a limited capacity for heating water, where the capacity for heating water is smaller than the use of the hot water such the water has to be heated before use—not for concurrent use.

SUMMARY OF THE INVENTION

The immediate invention provides a water heating system that is capable of rapid water heating with results which are comparable to on-demand water heaters. The system can be fitted to an existing electric water heater by simply swapping out the heating element (from the bottom of the water heater) with a coiled heat exchanger precisely would around a central flange. The coiled heat exchanger is preferably copper heat exchanger.

According to the present invention there is provided a water heating system for a domestic hot water tank, the system including: (a) a heat pump, the heat pump adapted to provide heat energy; and (b) a heat exchanger, the heat exchanger comprising a coil of thermally conductive material arranged such that a diameter of the coil is approximately between five and six times greater than a diameter of the thermally conductive material and the heat exchanger is adapted to be installed in the domestic hot water tank and operationally coupled to the heat pump.

According to further features in preferred embodiments of the invention described below the diameter of the coil is at the most five times greater than the diameter of the thermally conductive material.

According to still further features in the described preferred embodiments the water heating system is adapted to raise a temperature of water in the domestic hot water tank by about 25° C. in approximately one hour.

According to still further features the water heating system is adapted to raise a temperature of water in the domestic hot water tank by between about 20° C. and 50° C. in approximately one hour.

According to still further features the water heating system is adapted to raise a temperature of water in the domestic hot water tank by between about 30° C. and 40° C. in approximately one hour.

According to still further features the water heating system is adapted to maintain the temperature of the water in the domestic hot water tank, within a 10° C. deviation of the temperature, while the water is exiting the domestic hot water tank at a flow rate of up to 4 gallons per minute (gpm).

According to still further features the water heating system is adapted to maintain a temperature of water in the domestic hot water tank, within a 10° C. deviation of the temperature, while water is exiting the domestic hot water tank at a flow rate of between 2 gallons per minute (gpm) and 5 gpm.

According to still further features the heat pump is selected from the ground including: an Air Source Heat Pump and an Exhaust Air Heat Pump.

According to still further features the heat pump includes: a fan, a compressor, an evaporator coil and an expansion valve.

According to still further features the heat pump is an evaporator unit of an air conditioning system.

According to still further features the air conditioning system has an energy consumption of between 0.55 kW and 1.9 kW per hour.

According to still further features the air conditioning system has an energy consumption of about 1.1 kW per hour.

According to still further features the thermally conductive material is copper piping.

According to still further features the copper piping has an outer diameter of between 9.5 and 22.5 mm.

According to still further features the copper piping has an outer diameter of about 16 mm.

According to still further features the heat exchanger is a universal heat exchanger adapted to fit in a standard hot water tank having an opening between 70 mm and 100 mm.

According to still further features the heat exchanger is adapted to be retrofit in a standard hot water tank having an opening at a base of the hot water tank with a diameter of approximately 92 mm.

According to still further features the system further includes (c) a solar panel, the solar panel adapted to receive water from the domestic hot water tank via a cold water outlet pipe and supply heated water to the domestic hot water tank via a hot water intake pipe.

According to another embodiment there is provided a water heating system for a domestic hot water tank, the system including: (a) a heat pump, the heat pump adapted to provide heat energy; and (b) a heat exchanger, the heat exchanger comprising a coil of thermally conductive material arranged to transfer the heat energy from the heat pump to the domestic hot water tank so as to raise a temperature of water in the domestic hot water tank by between about 20° C. and 50° C. in approximately one hour.

According to still further features the water heating system is adapted to raise the temperature of the water in the domestic hot water tank by between about 30° C. and 40° C. in approximately one hour.

According to still further features the water heating system is adapted to raise the temperature of the water in the domestic hot water tank by about 25° C. in approximately one hour.

According to still further features the water heating system is adapted to maintain the raised temperature of the water in the domestic hot water tank, within a 10° C. deviation of the temperature, while the water is exiting the domestic hot water tank at a flow rate of up to 4 gallons per minute (gpm).

According to still further features the heat exchanger is adapted to be retrofit in a hot water tank having an opening at a base of the hot water tank with a diameter of approximately 92 mm.

According to another embodiment there is provided a water heating system for a domestic hot water tank, the system including: (a) a heat pump, the heat pump adapted to provide heat energy; and (b) a heat exchanger, the heat exchanger comprising a coil of thermally conductive material arranged to transfer the heat energy from the heat pump to the domestic hot water tank so as to maintain a temperature of water in the domestic hot water tank between 40° C. and 60° C. while the water is exiting the domestic hot water tank at a flow rate of between 2 and 5 gallons per minute (gpm).

According to still further features the flow rate is between 3 and 4 gpm.

According to still further features the cold water entering the domestic hot water tank is at a temperature of between 1° C. and 25° C.

According to still further features the temperature of the cold water entering the domestic hot water tank is between 10° C. and 20° C.

According to still further features the heat exchanger is adapted to be retrofit in a hot water tank having an opening at a base of the hot water tank with a diameter of approximately 92 mm.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a heat pump and heat exchanger heating system for a domestic hot water tank according to the present invention may be better understood with reference to the drawings and the accompanying description.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements so that in the drawings and descriptions set forth, identical reference numerals indicate those components that are common to different embodiments or configurations.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Positional terms such as "upper", "lower" "right", "left", "bottom", "below", "lowered", "low", "top", "above", "elevated", "high", "vertical" and "horizontal" as well as grammatical variations thereof as may be used herein do not necessarily indicate that, for example, a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or similarly modified.

Accordingly, it will be appreciated that the terms "bottom", "below", "top" and "above" may be used herein for exemplary purposes only, to illustrate the relative positioning or placement of certain components, to indicate a first and a second component or to do both.

Figure 1:
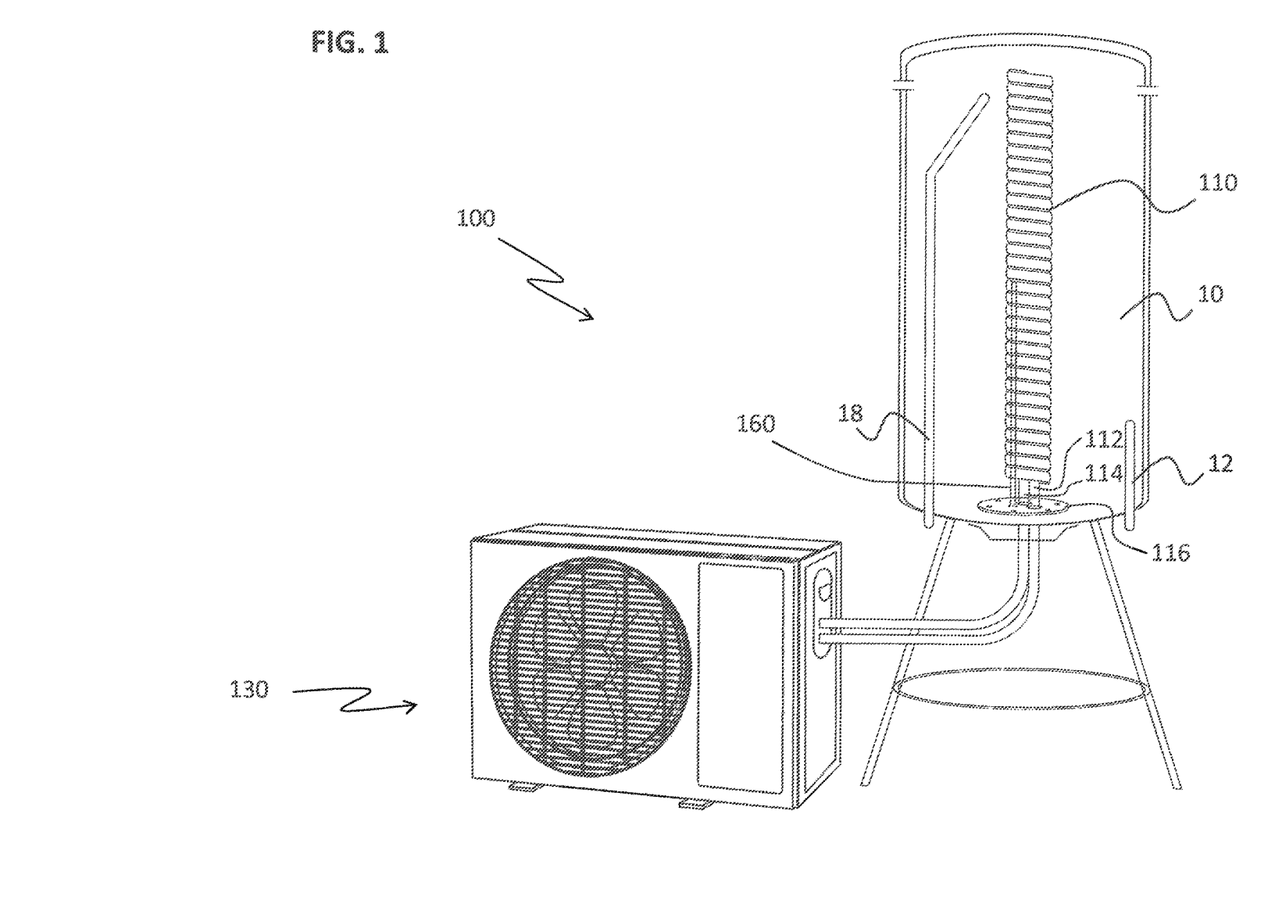
FIG. 1 is a diagram of the immediate innovative water heating system.

Referring now to the drawings, FIG. 1 illustrates a diagram of the immediate innovative water heating system 100. The system includes a coiled heat exchanger 110 that is installed in the domestic hot water tank 10 and a heat pump unit 130. The coiled heat exchanger 110 comprises piping or tubing of a thermally conductive material that is coiled in a tight spiral. The piping, arranged as a coiled heat exchanger, is installed in the hot water tank.

Figure 2:
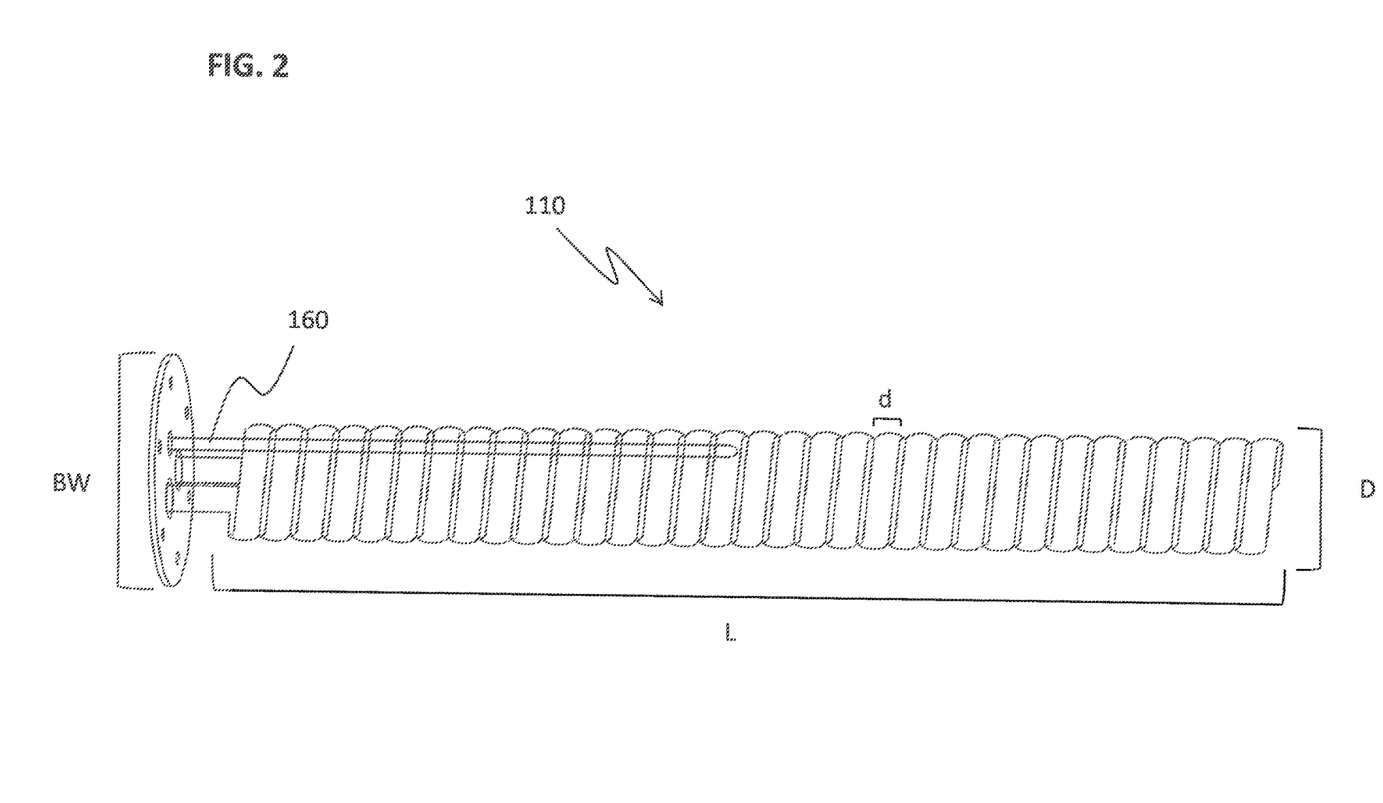
FIG. 2 is a magnified view of an exemplary heat exchanger of the invention.

A magnified view of an exemplary heat exchanger 110 of the invention is shown in FIG. 2. The term 'diameter', as used herein, refers to an outer diameter (OD), unless specifically mentioned otherwise. The diameter of the piping/tubing is denoted with the small letter 'd'. The diameter of the exchanger coil is denoted with a large letter 'D'. The length of the spiral is denoted with the letter 'L'. The diameter of the base plate is denoted with the letters 'BD'.

Preferably, the diameter D of the heat exchanger 110 is between 5 and 6 times greater than the diameter d of the piping. More preferably the diameter of the heat exchanger is no more than approximately 5 times greater than the diameter of the heat exchanger piping. Even more preferably, the diameter D of the heat exchanger is no more than approximately four times greater than the diameter d of the heat exchanger piping.

Preferably the thermal heating material is copper piping. While the use of copper piping in the heat exchanger is preferred, it is made clear that tubing or piping of any applicable material can be used instead of the copper piping. In preferred embodiments, the piping has a diameter d of between 9.5 mm and 22.5 mm. In even more preferable embodiments, the heat exchanger piping has a diameter d of 16 mm (⅝ inch). Preferably the heat exchanger coil has a diameter D between 70 mm-100 mm. Still more preferably, the heat exchanger coil has a diameter D of about 80 mm. It is noted that the standard size of the opening at the base of a domestic water tank is approximately 92 mm. The immediate heat exchanger is a universal heat exchanger that fits every hot water tank with an opening in the base of the tank.

An approximate length L of the spiral is calculated by multiplying the number of convolutions c by the diameter d of the coil and the space s between each coil: $c \times (d+s) = L$.

What must also be taken into consideration is that the piping is slightly deformed during the coiling process so that the real outer diameter of the individual convolutions is slightly greater than initial diameter. For example, in the test case discussed below the piping used was 16 mm in diameter and included 33 convolutions. In that case, the total length of the spiral was 730 mm. The base plate has a diameter BD of 160 mm in the test case discussed below.

In a preferred embodiment of the invention, the innovative heating system 100 is capable of heating a domestic hot water tank 10 (e.g. a 100 liter, 150 liter or 200 liter hot water tank) from room temperature (24° C.) to at least 50° C. in one hour (i.e. raising the temperature of the water by about 25° C. in one hour). More generally, the heating system of the immediate invention is adapted to heat water in the hot water tank by between 20° C. and 30° C. in one hour. In tests, a 150 liter tank has been heated to 50° C. from room temperature in 50 minutes. For the purposes of comparison, the a 150-liter hot water tank takes approximately three hours to heat with a legacy heating element.

In general, the height of the hot water tank is relative to the capacity of the tank. Therefore, tank with a greater capacity are taller that tanks with a lesser capacity. As a result, the length of the heat exchanger (i.e. the number of coils/convolutions making up the heat exchanger) is greater for a higher capacity tank and of a lesser length for a tank of lesser capacity. Furthermore, the immediate coiled heat exchanger acts as a heating funnel inside the coil. As a result, within five minutes of heating, there is already a usable amount of hot water at the top of the tank, by the hot water outlet.

The large amount of piping in the heat exchanger and, hence, large amount of exposed surface area of the heat exchanger that is in contact with the water allows the heating system to rapidly heat the water in the water tank. Rapid heating can be subjectively interpreted by different people in different ways. For the purposes of this document, rapid heating, in one definition, is defined as the ability to heat water from a room temperature (approximately 24° C.) to a temperature of between 50° C. and 60° C. in one hour.

A further, complementary definition of rapid heating is the ability to maintain water at an approximate heat of 50° C. (e.g. between 45° C. and 55° C.)—which is about 25° C. hotter than the temperature of the water entering the tank (if the water is at room temperature)—while the water is being extracted from the tank at a flow rate defined by a domestic faucet opened to fill capacity. In general terms, water exits a hot water tank at a flow rate between 2 and 5 gallons per minute (gpm), depending on the type of faucet. Older faucets have a higher flow rate, newer faucets have a lower flow rate. Many of the newer faucets have aerators installed on them that lower the flow rate even more (e.g., to about 2.2 gpm).

Preferably the heating system is adapted to maintain a hot water temperature (e.g. between 40° C. and 60° C.) while water is exiting the hot water tank at a flow rate of between 2.25-5 gpm. Preferably, the temperature can be maintained while water is exiting (and cold water is entering) the tank at a flow rate of up to 4 gpm. Preferably, the temperature is maintained within a deviation of 10° C. higher or lower than the mean temperature of the hot water. Of course, the flow rate of a faucet or shower includes both hot and cold water running simultaneously, therefore, in real use, the flow rate of the hot water is less than the flow rate of the faucet or shower head.

A conventional shower head uses between 3 and 4 gallons per minute (3.5 gpm), while a low-flow shower head uses about 2 gallons per minute (2 gpm). The aerator (the screw-on tip of the faucet nozzle) restricts the maximum flow rate of water from the faucet. New kitchen faucets are usually equipped with a 2.2 gpm (8.3 liters per minute) aerator. Bathroom faucets can have aerators that restrict flow to 1.5, 1.2, 1.0, or 0.5 gallons per minute (5.7, 4.5, 3.8 or 1.9 Lpm).

Rapid heating has two clear advantages. The first advantage is that the heat pump needs to work for a shorter period of time, thereby lowering the power consumption and running cost. The second advantage is that even if the entire water supply is used within a short period of time, the heating capacity of the heat exchanger is such that the system is able to provide hot water on a consistent, ongoing basis. Therefore, the immediate system has a heating throughput which is comparable to other continuous flow water heating systems.

Advantageously, no gas is consumed in the heating process. Comparatively speaking, heating water using a gas heater in Israel, such as a Junkers™ gas heater, is four times more expensive than using the heating system of the immediate invention. With regards to a hot water tank that uses a thermally resistant heating element, the electricity consumption of the immediate system is approximately 3.5 times less than the electricity consumption for heating the same water tank with the thermally resistant heating element.

The great discrepancy between the electricity usages is due to the face that a thermally resistant heating element converts electricity directly into heat (a COP of 1). On the other hand, the heat pump of the immediate invention has a high energy coefficient or coefficient of performance. The coefficient of performance or COP (sometimes CP) of a heat pump is a ratio of heating or cooling provided to work required. Higher COPs equate to lower operating costs. The COP may exceed 1, because, instead of just converting work to heat (which, if 100% efficient, would be a COP of 1), it pumps additional heat from a heat source (e.g. ambient air) to where the heat is required. For example (which is discussed in greater detail below), a 1.5 hp air conditioning unit has a 3.45 COP, hence nearly 3.5 times more heat is generated for the same amount of energy.

Still further, the amperage of an electric hot water heater, is between about 10 and 17 amps. By contrast, the amperage of the heat pump, for a 1.5 hp unit, is between and 7.5 amps. As such, running the immediate water heating system on a domestic electricity grid places a significantly smaller load on the grid than an electric water heater (an average of about 40% smaller load).

Figure 3:
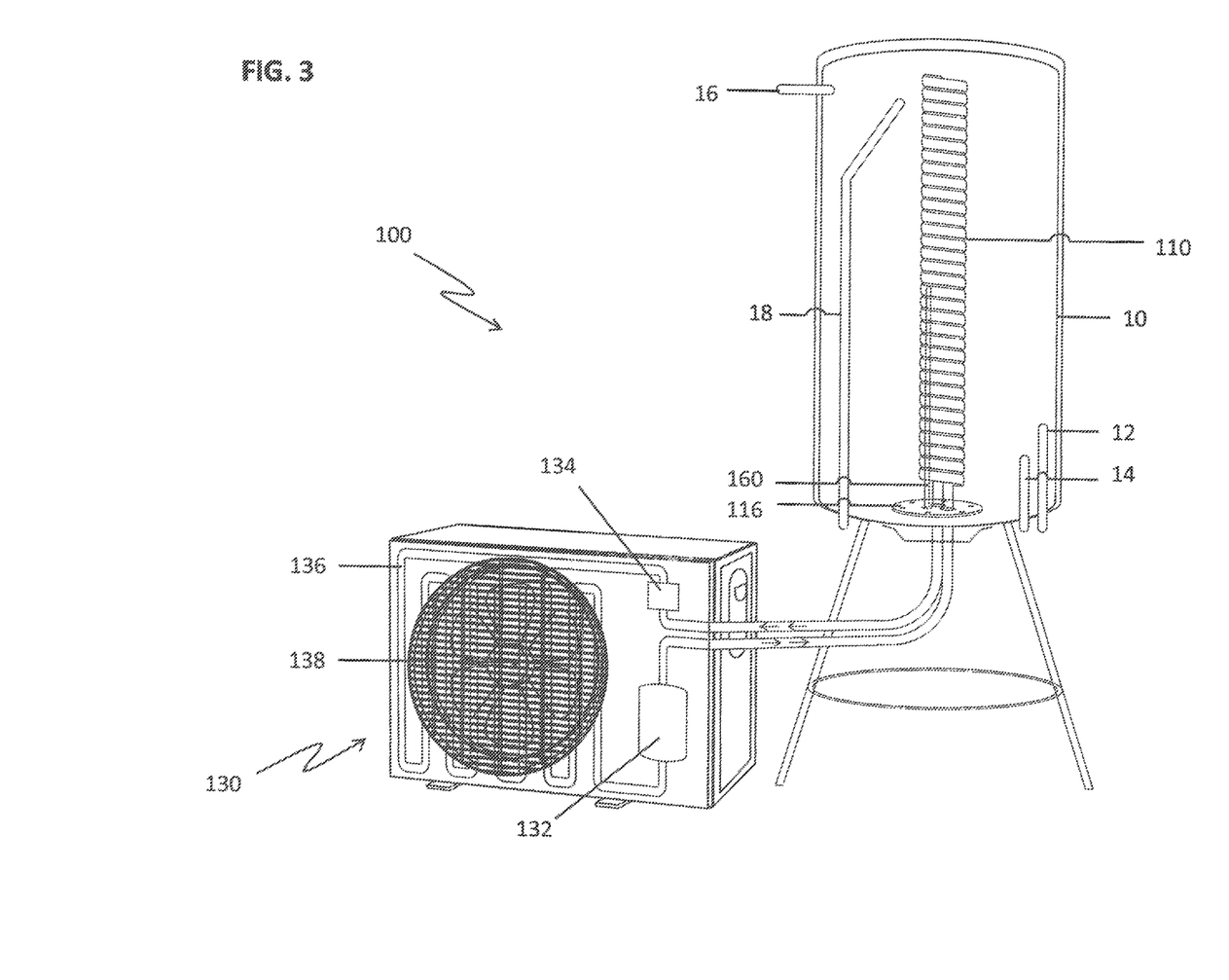
FIG. 3 is a diagram of the system with the internal components of the heat pump visible.

FIG. 3 illustrates a diagram of the system 100 with the internal components of the heat pump visible. The heat pump 130 absorbs heat at the source and releases the heat inside the hot water tank via the heat exchanger. Preferably the heat pump is an Air Source Heat Pump (ASHP). Under the principles of vapor compression refrigeration, an ASHP uses a refrigerant system involving a compressor and a condenser to absorb heat at one place and release it at another. The ASHP absorbs heat from outside air and releases the heat inside the domestic hot water tank.

Alternatively or additionally, the heat pump can be an Exhaust Air Heat Pump (EAHP) extracts heat from the exhaust air of a building. This requires at least mechanical exhaust. This type of heat pump requires a certain air exchange rate to maintain its output power. Since the inside air is approximately 20-22 degrees Celsius (20-22° C.) all year round, the maximum output power of the heat pump does not varying with the seasons and outdoor temperature. The EAHO is a supplemental heat source that captures some (but not all) of the heat that otherwise would have been exhausted from the building. It reduces the amount of heat loss caused by a ventilation system.

The refrigeration process is well known in the art. A heat pump is an air conditioner in which the refrigeration cycle is reversed, producing heating instead of cooling in the target environment. In the immediate system, the refrigeration cycle works as follows: A refrigerant fluid (e.g. Freon) is housed in the closed system includes the heat pump 130 and heat exchanger 110. In a preferred embodiment, the heat pump 130 is an air conditioner evaporator unit. (In regular air conditioning system the evaporator is used to allow a compressed cooling chemical, such as R-22 (Freon) or R-410A, to evaporate from liquid to gas while absorbing heat in the process.) The heat pump 130 attracts thermal energy from the environment (e.g. hot air) which heats the refrigerant fluid. A compressor 132 compresses the low pressure vapor resulting in high pressure, high temperature fluid (superheated vapor) which is fed into the heat exchanger 110. In the heat exchanger, the heated fluid warms the water and the water cools the fluid. The heat exchanger acts as a condenser to remove the superheat and then condense the vapor back into liquid. The cooled fluid cycles back into the heat pump, continuing the cycle.

The system includes an expansion valve 134 feeding the evaporation coil 136. The fluid exits the tank and reenters the heat pump, passing through the expansion valve 134 which abruptly lowers the pressure, causing flash evaporation and auto-refrigeration of, typically, less than half of the liquid. That results in a mixture of liquid and vapor at a lower temperature and pressure. The cold liquid-vapor mixture then travels through the evaporator coil 134 and is completely vaporized by cooling the warm air being blown by a fan 138 across the evaporator. The resulting refrigerant vapor returns to the compressor 132 inlet to complete the thermodynamic cycle.

Another possible embodiment of the immediate invention is an embodiment whereby the innovative heat exchanger is retrofit to an existing hot water tank which has an electric powered heating element. Many hot water tanks are heated by an electric heating element. The cylindrical tanks are mounted on stands either in the roof or on the roof Tanks with heating elements generally supplement the heating capability with solar panels. The solar panels are (usually) mounted on the roof, therefore, the hot water tanks are located near the solar panels (see below for a broader discussion).

The tanks (usually) stand upright where the 'bottom' panel has at least a water inlet pipe for cold water coming from the water main as well as an electronic connection (e.g. a cable or cable bundle) which provides electricity to the heating element. Thermostats and control panels are not discussed here. The heating element is mounted on the bottom panel, on the inside of the tank. The heated water rises to the top of the tank and an outlet pipe, situated near the top of the tank, carries the hottest water into the house. Sometimes a tank is laid on its side, due to ulterior considerations. Therefore, the 'bottom' section is the part that is usually at the bottom of the tank when arranged in the normal fashion. The terms 'bottom' and 'base' are used interchangeably with regards to the aforementioned side of the tank. A base plate 116 is the section of metal that is fixedly coupled to the bottom of the tank, over an aperture in the bottom side of the tank. The base plate has the heating element mounted thereon as well as a thermal sensor 160.

The base plate is screwed into place by the applicable screws. The aperture in a standard hot water tank is approximately 92 mm in diameter.

The lifespan of the heating element is shortened due to calcification on the element. Regions with high levels of calcium in the water (also known as "hard water") tend to cause a heating element to short out once in 5-10 years (depending on use and calcium level).

Hard water forms deposits that clog plumbing. These deposits, called "scale", are composed mainly of calcium carbonate ($CaCO_3$), magnesium hydroxide ($Mg(OH)_2$), and calcium sulfate ($CaSO_4$). Calcium and magnesium carbonates tend to be deposited as off-white solids on the inside surfaces of pipes and heat exchangers. This precipitation (formation of an insoluble solid) is principally caused by thermal decomposition of bicarbonate ions but also happens in cases where the carbonate ion is at saturation concentration. The resulting build-up of scale restricts the flow of water in pipes. In boilers, the deposits impair the flow of heat into rater, reducing the heating efficiency and allowing the metal boiler components to overheat. In a pressurized system, this overheating can lead to failure of the boiler. The damage caused by calcium carbonate deposits varies on the crystalline form, for example, calcite or aragonite. The calcium coats the element during the heating process. Once the element is completely coated it will short out.

The burned out heating element can be swapped out with the innovative heat exchanger of the immediate invention. The tank does not need to be replaced. Alternatively, a new system (non-retrofit) be constructed making use of readily available materials or components. At present, hot water tanks are already mass produced and new homes are built with a designated area for the hot water tank. Furthermore, the heat pump can be a repurposed air conditioner which would only need to be slightly modified for use as the heat pump of the immediate invention. Production of the immediate system is less of a burden when existing components are used. Therefore, the immediate heat exchanger is a 'universal' heat exchanger which can be used on all types of hot water tanks. The heat exchanger is especially suited to the standard hot water tanks which use electrical water heaters, and commonly, electrical heaters together with solar panels.

Figure 4:
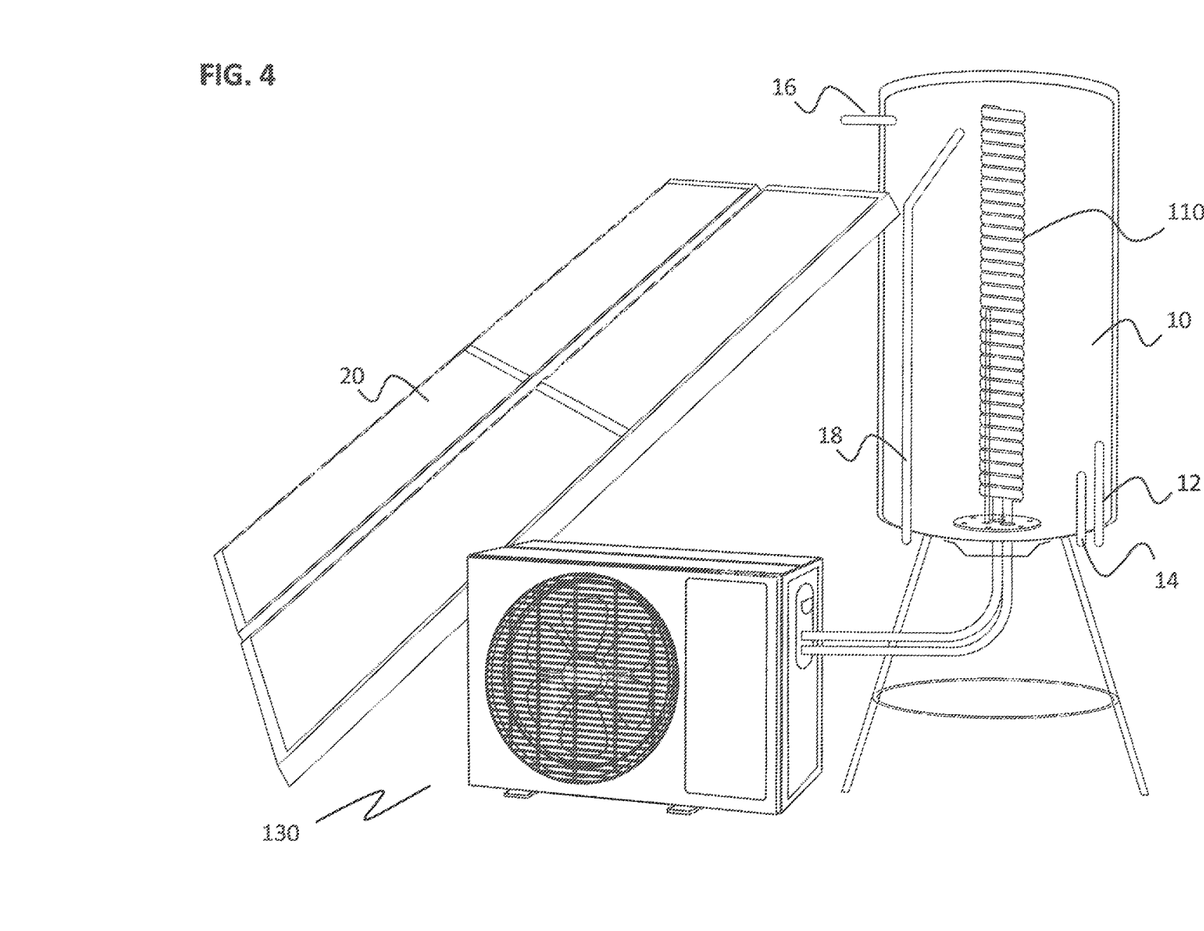
FIG. 4 is a diagram of another possible configuration of the immediate invention further comprises a solar panel.

Another possible configuration is shown in FIG. 4. In FIG. 4 the system further comprises a solar panel 20. Solar panels are known in the art. Countries in the Mediterranean Basin, such as Israel and Cyprus, use solar panels to heat water in almost every household. During the winter months, or sunless periods, the water is heated as needed using either an electric water heater or an on-demand heating system. The system of the immediate invention can be used in a solar heating setup as well. With a solar panel heating the water in the water tank, the heat pump is needed much less. Only in the case of significant use and/or a lack of solar energy (e.g. in the winter months) is the heat pump activated. Alternatively, the heating system can be active on a consistent basis so that there is sufficient hot water available on demand at all times. When the solar panels do not sufficiently heat the water to between 45° C. and 55° C. then the heat pump is activated automatically by the thermostat receiving temperature information from the heat sensor.

Of course, the aforementioned control unit can be programmed to not activate during certain hours when hot water is not usually used. For example, between the hours of 2 am and 5 am, most people do not generally bath or shower. In a further embodiment, the system can include a flow sensor in the outlet (or inlet) pipe. If the flow sensor senses that water is being drawn from the hot water tank, then the control unit can be additionally or alternatively be programmed to activate the eat pump so as to maintain the desired temperature level in the tank.

In a water heating system that includes solar panel 20, cold water runs from the hot water tank into the solar panel via a pipe 14 that is installed in the lower part of the tank where the colder water is found (preferably near the cold water intake pipe 12). The water runs through the solar panel and is heated by solar energy concentrated on the pipes. The heated water flows from the solar panel 20 back into the upper portion of the hot water tank via the solar intake pipe 16. Hot water is drawn from the upper part of the tank via the hot water outlet pipe 18 into the household system.

During the summer months the solar panel is usually able to heat sufficient hot water for domestic use, in an average household. During the winter months, the solar energy can be supplemented (or replaced, in other configurations) by the heating system of the immediate invention.

Example—Test Case 1—Retrofit Method

One exemplary implementation of the immediate system in a 150-liter hot water tank is described immediately. An electrically heated 150-liter water tank was used in this test case. The 150-liter tank is 1030 mm tall with a diameter of 570 mm. The internal height of the tank is 790 mm, the remainder of the height is insulation. The tank was drained and the heating element of the water boiler was extracted from the bottom of the tank through a circular opening at the bottom of the tank. The opening has a diameter of approximately 92 mm. A funnel shaped flange extends out from the opening to about a diameter of 160 mm. The extracted heating element is mounted on a circular base plate. The base plate has a diameter BD of 160 mm which closes over the circular funnel opening, with screws mounted on the funnel portion, outside of the tank. The heating element was removed from the base plate and discarded. The base plate was repurposed/recycled and for use in the immediate system. A new base plate can alternatively be used.

(For a custom made system (i.e. not retrofit), the coiled heat exchanger is mounted on a base plate having the size and shape necessary to cover the opening when the heat exchanger is installed in the tank.) In this case, the heat exchanger was mounted on the recycled base plate after removing the old heating element. The heat exchanger is fashioned from ⅝ inch (approximately 16 mm) copper piping that has been tightly coiled into a long spiral and mounted on the base plate. For the 150-liter water tank, the spiral is approximately 770 mm in height (of that, the coils/convolutions have a height of 730 mm and 'legs' of 40 mm), and includes 33 coils/convolutions. The external diameter of the coil/spiral/heat exchanger is 80 mm. (See below the discussion regarding the obstacles overcome to successfully reach such a tightly coiled heat exchanger.)

The manufacturing process for the heat exchanger is discussed below in greater detail. Approximately 9 meters of copper piping are inserted into the tank. Of those nine meters, about 8.3 meters of the piping make up the coiled section of the heat exchanger and another about 0.7 meters of piping runs from the top of the coil back down to the bottom of the tank and out through an opening in the base plate.

The piping is connected to an outlet pipe via a connector piece attached to the base plate. A similar intake pipe connects to the inlet end of the heat exchanger via a second connector piece connected to the base plate. Thus, the refrigerant fluid flows in and out of the tank via the connector pieces in the base plate, forming a closed, fluid circuit. Intake 112 and outlet 114 portions of the piping below the coils are referred to herein as 'legs', seeing as the coils 'rest' on these two sections of piping.

A heat sensor 160 is likewise attached through the base plate with the probe/sensor on the inside of the tank and the connector cable (not shown) extending out of the tank to the control unit. The heat sensor is coupled to a control unit (not shown) including a thermostat (not shown) that monitors the temperature of the water in the tank and sends instructions to the heat pump to either stop working or start/continue working, based on the temperature of the water as sensed by the heat sensor.

The base plate 116, as mentioned above, has a diameter of approximately 16 cm and was hermetically fastened to the bottom of the funnel flange with six screws. The intake and outlets pipes (on the outside of the tank) are coupled to the heat pump arrangement. The heat pump, in the immediate exemplary embodiment, is the evaporator unit of a 1.5 horse power air conditioner which attracts ambient heat from the outside air. A 1.5 HP Tadiran™ i18 air conditioner, by Tadiran Holdings, Israel, was used in the immediate test case.

The 1.5 HP air conditioner used in the test case has an efficiency coefficient (COP) of 3.45 and supplies 4.453 kW per hour. Such a device is able to raise the temperature of a 150 liter tank of water by 25° C. in one hour. One kilocalorie is defined as the amount of energy needed to raise the temperature of one kilogram of water by one degree Celsius. Therefore, the approximate energy expenditure is given by the following equation:

150 (liters)×25=3750 kilocalories 3750 kilocalories/860 (860 kilocalories is equal to 1 kW)=4.360 kW p/hr.

The immediate system, at 1.5 HP (1.1 kW) energy consumption (which actually consumes slightly more energy) supplies approximately 4.453 kW p/h. Therefore, the immediate system is able to raise the temperature of the water by 25° C. in less than one hour. End of example.

Process for Preparing the Coiled Heat Exchanger

As discussed above, in preferred embodiments, the thermally conductive material used in the heat exchanger is copper piping. Copper has many desirable properties for thermally efficient and durable heat exchangers. First and foremost, copper is an excellent conductor of heat. This means that copper's high thermal conductivity allows heat to pass through it quickly. Other desirable properties of copper in heat exchangers include its corrosion resistance, biofouling resistance, maximum allowable stress and internal pressure, creep rupture strength, fatigue strength, hardness, thermal expansion, specific heat, antimicrobial properties, tensile strength, yield strength, high melting point, alloyability, ease of fabrication, and ease of joining.

Those skilled in the art are aware that bending copper piping/tubing can be very difficult. The metal itself is not hard to bend, but the problem is bending the tubing is such a manner that the tubing does not buckle or kink. When making the heat exchanger it is important to get as much surface area of tubing into as little as possible space so as to improve the efficiency of the condenser as well as to save on costs. This requires the copper to be spiraled in as small as possible diameters.

The following abbreviations are used:

d=Diameter of copper tube

D=Diameter of the coil into which the copper tube is to be rolled or spiraled.

Copper Tubing (or Pipe) is Normally Bought in Two Conditions:

Soft annealed copper is sold in rolls and this bends the easiest "straight from the coil". This is the copper to use when making a spiraled heat exchanger. Cold drawn copper is sold in straight lengths and is much harder than annealed copper because the copper work-hardened during the drawing process. The copper needs to be annealed before bending otherwise it is very difficult to bend and tends to collapse or crack easily. Cold drawn copper is less preferable for spiraled condensers the heat exchanger, without being annealed first.

Large diameter coils are generally defined whereby the diameter (D) of the coil is at least six times greater than the diameter (d) of the copper tube (D>6×d). It is quite easy to bend copper tubing when the diameter around which the copper tube is to be bent is more than 6 times the diameter of the copper tubing. The copper tubing can be rolled around a pipe with suitable diameter by hand. It is easy and the coils will not collapse.

Medium diameter coils are generally defined whereby the diameter of the coil (D) is at least five times greater than the diameter of the copper tube (d) and at the most six times greater than the diameter of the copper tube (d×5<D<6×d). For bending diameters between 5 and 6 times the diameter of the copper tube, commercial tube benders work quite well. Bending tools or bending springs can be used successfully. Unfortunately the bending tools are only suitable for 180 degree (or less) bends and one cannot bend tighter coils as the tool itself gets in the way of the copper tubing when making coils. The tools are also limited by the fixed diameter of the specific tool.

The bending springs works well but cannot bend into too tight coils. When trying to bend small diameters with bending springs, the springs can get extremely difficult to remove from the copper tube.

Small diameter coils are generally defined whereby the diameter (D) of the coil is at the most, six times greater than the diameter (d) of the copper tube (D≤5×d). When the bending diameter is less than 5 times the tube diameter, the copper tube tends to collapse/buckle quite easily. The more the copper is annealed (softened) the easier it collapses as well. The immediate invention has a preferred embodiment Whereby the nominal size of the piping is 16 mm (⅝ inch) having a outside diameter of 19.05 mm (¾ inch). The preferred diameter of the coiled heat exchanger is 80 mm, fitting in the category of small diameter coils. In this case, the diameter of the pipe d is less than four times the diameter D of the heat exchanger coil.

Anecdotally, practitioners have not even attempted to create small diameter coils without employing complex annealing techniques and/or using some filler material to prevent kinking/buckling of the pipe. Practitioners have used various filler materials such as ice (freezing water in the pipe before coiling the pipe), salt, custom-made filler compounds, etc. to prevent kinking during the coiling process.

The immediate invention includes the innovative process and machinery for coiling small diameter coils without annealing the piping or filling the pipes with filler materials.

A Coiling Machine was manufactured that bent the pipes at the exact degree to bend the pipes without kinking or flattening the pipes. The pipes were slightly deformed, but to a degree that did not change the internal volume is any significant way. No annealing was used to facilitate the coiling.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A water heating system for a domestic hot water tank, the system comprising:
   (a) a heat pump, said heat pump adapted to provide heat energy; and
   (b) a heat exchanger, said heat exchanger comprising a coil of thermally conductive piping, said thermally conductive piping having an outer, cross-sectional diameter of between 9.5 and 22.5 mm and being arranged such that a diameter of said coil is approximately between five and six times greater than said outer, cross-sectional diameter of said thermally conductive piping and said heat exchanger is adapted to be installed in the domestic hot water tank and operationally coupled to said heat pump.

2. The water heating system of claim 1, wherein said diameter of said coil is at the most five times greater than said outer, cross-sectional diameter of said thermally conductive piping.

3. The water heating system of claim 1, wherein the water heating system is adapted to raise a temperature of water in the domestic hot water tank by about 25° C. in approximately one hour.

4. The water heating system of claim 1, wherein the water heating system is adapted to raise a temperature of water in the domestic hot water tank by between about 20° C. and 50° C. in approximately one hour.

5. The water heating system of claim 4, wherein the water heating system is adapted to raise a temperature of water in the domestic hot water tank by between about 30° C. and 40° C. in approximately one hour.

6. The water heating system of claim 4, wherein the water heating system is adapted to maintain said temperature of said water in the domestic hot water tank, within a 10° C. deviation of said temperature, while said water is exiting the domestic hot water tank at a flow rate of up to 4 gallons per minute (gpm).

7. The water heating system of claim 1, wherein the water heating system is adapted to maintain a temperature of water in the domestic hot water tank, within a 10° C. deviation of said temperature, while water is exiting the domestic hot water tank at a flow rate of between 2 gallons per minute (gpm) and 5 gpm.

8. The water heating system of claim 1, wherein said heat pump is selected from the ground including: an Air Source Heat Pump and an Exhaust Air Heat Pump.

9. The water heating system of claim 1, wherein said heat pump includes:
   a fan, a compressor, an evaporator coil and an expansion valve.

10. The water heating system of claim 8, wherein said heat pump is an evaporator unit of an air conditioning system.

11. The water heating system of claim 10, wherein said air conditioning system has an energy consumption of between 0.55 kW and 1.9 kW per hour.

12. The water heating system of claim 10, wherein said air conditioning system has an energy consumption of about 1.1 kW per hour.

13. The water heating system of claim 1, wherein said thermally conductive piping is copper piping.

14. The water heating system of claim 13, wherein said copper piping has an outer cross-sectional diameter of about 16 mm.

15. The water heating system of claim 1, wherein said heat exchanger is a universal heat exchanger adapted to fit in a standard hot water tank having an opening between 70 mm and 100 mm.

16. The water heating system of claim 1, wherein said heat exchanger is adapted to be retrofit in a standard hot water tank having an opening at a base of the hot water tank with a diameter of approximately 92 mm.

17. The water heating system of claim 1, further comprising:
(c) a solar panel, said solar panel adapted to receive water from the domestic hot water tank via a cold water outlet pipe and supply heated water to the domestic hot water tank via a hot water intake pipe.

18. A water heating system for a domestic hot water tank, the system comprising:
(a) a heat pump, said heat pump adapted to provide heat energy; and
(b) a heat exchanger, said heat exchanger comprising a coil of thermally conductive material arranged to transfer said heat energy from said heat pump to the domestic hot water tank so as to raise a temperature of water in the domestic hot water tank by between about 20° C. and 50° C. in approximately one hour;
wherein said heat exchanger is a universal heat exchanger adapted to retrofit in a standard hot water tank having an opening between 70 mm and 100 mm.

19. The hot water system of claim 18, wherein the water heating system is adapted to raise said temperature of said water in the domestic hot water tank by between about 30° C. and 40° C. in approximately one hour.

20. The hot water system of claim 18, wherein the water heating system is adapted to raise said temperature of said water in the domestic hot water tank by about 25° C. in approximately one hour.

21. The hot water system of claim 20, wherein the water heating system is adapted to maintain said raised temperature of said water in the domestic hot water tank, within a 10° C. deviation of said temperature, while said water is exiting the domestic hot water tank at a flow rate of up to 4 gallons per minute (gpm).

22. The water heating system of claim 18, wherein said heat exchanger is adapted to be retrofit in a hot water tank having an opening at a base of the hot water tank with a diameter of approximately 92 mm.

23. A water heating system for a domestic hot water tank, the system comprising:
(a) a heat pump, said heat pump adapted to provide heat energy; and
(b) a heat exchanger, said heat exchanger comprising a coil of thermally conductive piping arranged to transfer said heat energy from said heat pump to the domestic hot water tank so as to maintain a temperature of water in the domestic hot water tank between 40° C. and 60° C. while said water is exiting the domestic hot water tank at a flow rate of between 2 and 5 gallons per minute (gpm);
wherein said thermally conductive piping has an outer, cross-sectional diameter of between 9.5 and 22.5 mm and is arranged such that a diameter of said coil is approximately between five and six times greater than said outer, cross-sectional diameter of said thermally conductive piping: and
wherein said beat exchanger is a universal heat exchanger adapted to retrofit in a standard hot water tank having an opening between 70 mm and 100 mm.

24. The hot water system of claim 23, wherein said flow rate is between 3 and 4 gpm.

25. The hot water system of claim 23, wherein cold water entering the domestic hot water tank is at a temperature of between 1° C. and 25° C.

26. The hot water system of claim 23, wherein said temperature of said cold water entering the domestic hot water tank is between 10° C. and 20° C.

27. The water heating system of claim 23, wherein said heat exchanger is adapted to be retrofit in a hot water tank having an opening at a base of the hot water tank with a diameter of approximately 92 mm.

* * * * *